June 13, 1950     A. R. MAIER     2,511,729
TRAVELING BLOCK
Filed Nov. 24, 1948                            2 Sheets-Sheet 1
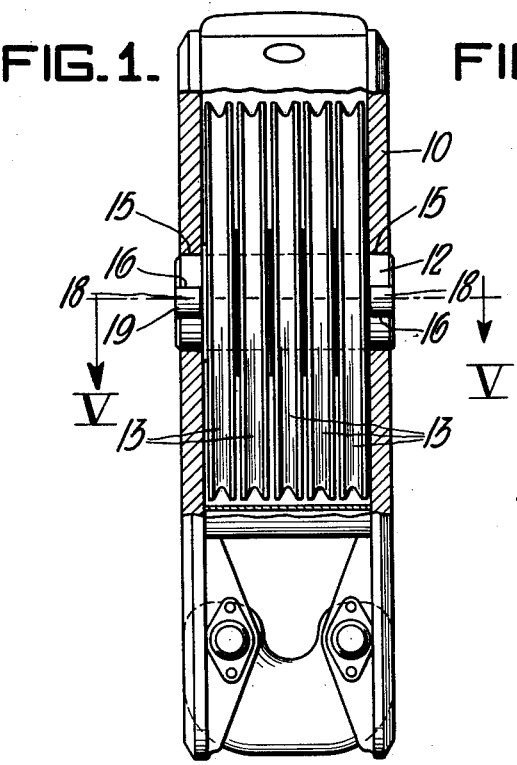
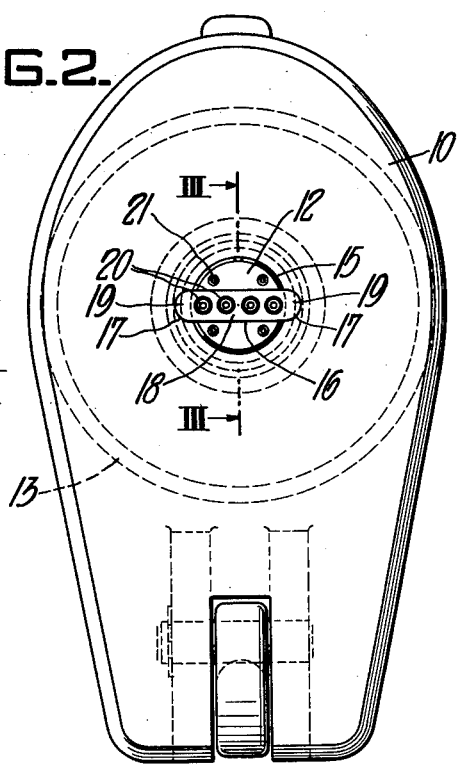
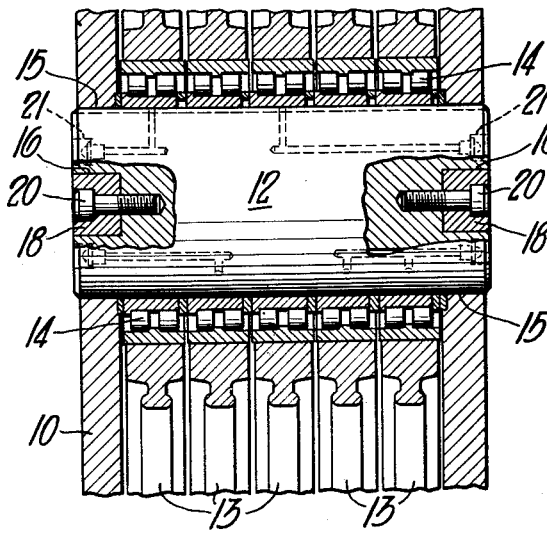
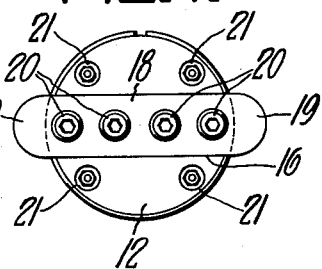
Inventor:
AUGUST R. MAIER,
by: Donald G. Dalton
his Attorney.

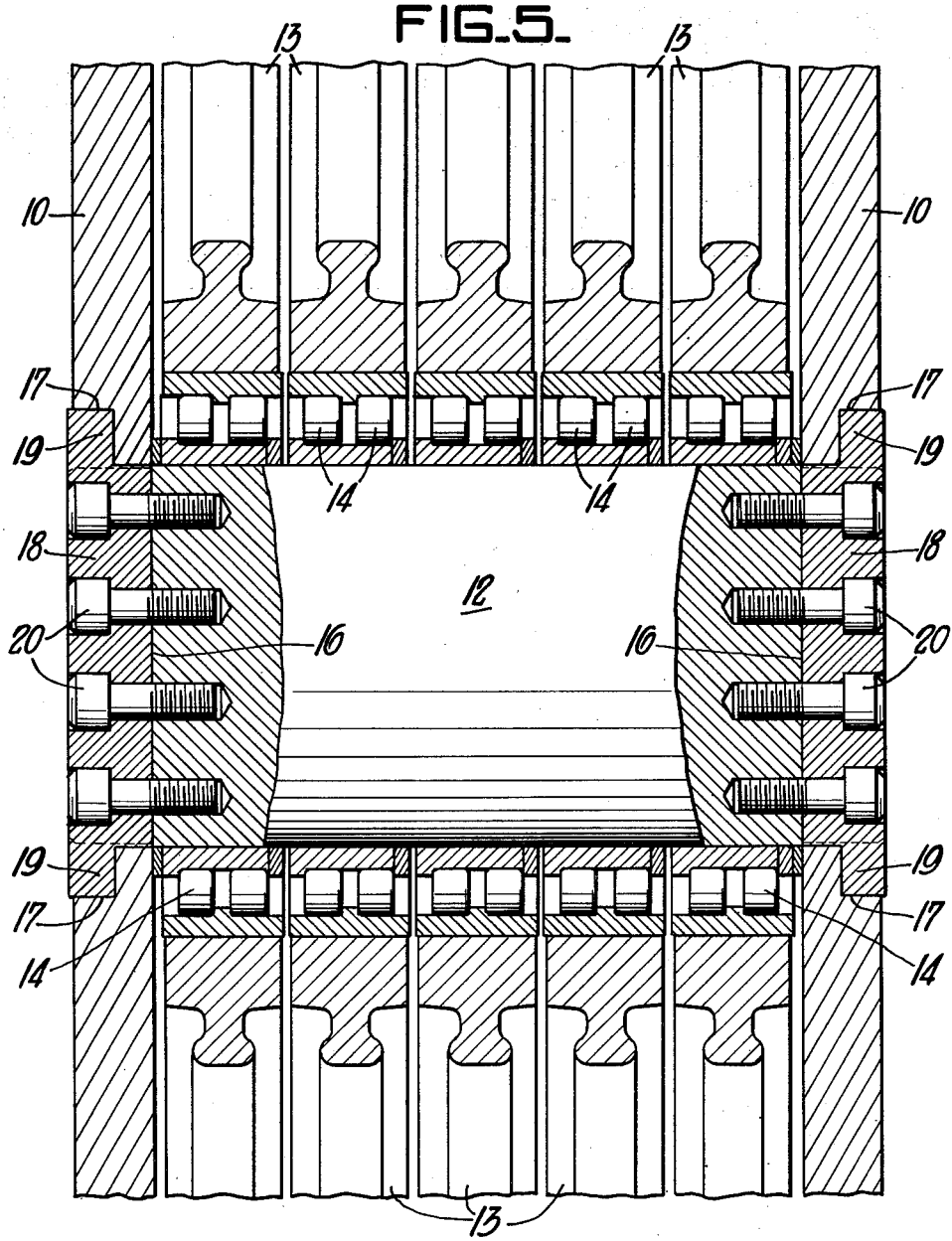

Patented June 13, 1950

2,511,729

UNITED STATES PATENT OFFICE 2,511,729

TRAVELING BLOCK

August R. Maier, Dallas, Tex., assignor to Oil Well Supply Company, a corporation of New Jersey Application November 24, 1948, Serial No. 61,858

3 Claims. (Cl. 254—192)

This invention relates to traveling blocks for hoisting equipment, such as well drilling rigs, and particularly to improved mounting means for the bearing pin.

In many types of equipment, such as drilling rigs, there is a premium on space, making it essential that the dimensions of traveling blocks and other components be kept to a minimum. Also for promoting safety the walls of such blocks must be free of outward protrusions.

An object of the present invention is to provide traveling blocks having improved pin mounting means which leave the housing walls virtually smooth and reduce the over-all thickness of the block over previous pin mountings with which I am familiar, and yet furnish a force transmitting contact between the pin and the full thickness of both housing walls and also enable the blocks to be assembled or dismantled readily.

In accomplishing this and other objects of the invention, I have provided improved details of structure, a preferred form of which is shown in the accompanying drawing, in which:

Figure 1 is a vertical sectional view of a traveling block which has an improved pin mounting means embodying features of the present invention;

Figure 2 is a side elevational view of the block;

Figure 3 is a vertical sectional view taken substantially on line III—III of Figure 2;

Figure 4 is an end elevational view of the bearing pin removed from the block; and Figure 5 is a horizontal sectional view taken substantially on line V—V of Figure 1.

In the drawing there is shown a traveling block which comprises a housing 10 and a bearing pin 12. The latter supports the usual sheaves 13, preferably on anti-friction bearings 14. Except for the novel means which mounts the pin in the housing walls, the block may be of any standard construction and hence is not described in further detail.

In accordance with the present invention, pin 12 is cylindrical and is received in axially aligned apertures 15 in opposite side walls of the housing. The end portions of the pin have force transmitting contacts with the housing walls through the full thickness of the latter. The end faces of the pin are substantially flush with the outer faces of these walls and contain diametric grooves 16, preferably of a depth substantially equal to the thickness of the housing walls. Said walls have rabbeted sections 17, which form continuations of grooves 16 when the pin is assembled with the housing. These rabbeted sections are of somewhat less depth than the thickness of the walls.

Retaining bars 18 are received within grooves 16 in the ends of the pin and have thinner end extensions 19 that are received within rabbeted sections 17 in the housing walls (Fig. 5). Removable cap screws 20 fix the retaining bars to the pin. The outer faces of the retaining bars and the ends of cap screws likewise are flush with the ends of the pin and housing walls. The only breaks in the otherwise smooth side walls of the block at the region of the pin are at the lubricating passages 21 in the ends of the pin and in the sockets or notches in the ends of the cap screws.

The foregoing construction reduces the thickness of the block over usual pin mounting means with which I am familiar, since the mounting means is contained fully within the thickness necessitated by the sheaves and housing walls. Hence the over-all thickness is confined to that needed for the sheaves and housing walls. The faces of these walls are substantially flush and have no protrusions of any kind.

While I have shown and described only a single embodiment of the invention, it is apparent that modifications may arise. Therefore, I do not wish to be limited to the disclosure set forth but only by the scope of the appended claims.

I claim:

1. In a traveling block having a housing, a plurality of sheaves and a bearing pin rotatably supporting said sheaves in said housing, means mounting said pin in said housing comprising retaining bars and screw threaded fasteners, said pin having a groove in each of its end faces, the walls of said housing having rabbeted sections forming continuations of each of said grooves, said retaining bars being received in said grooves and extending into said rabbeted sections, said threaded fasteners securing said retaining bars to said pin, the outer faces of the housing walls and said pin and said mounting means all being substantially flush, the pin having force transmitting contact with the housing walls through the full thickness of the latter, and the over-all thickness of said block being confined to that needed for the sheaves and housing walls.

2. In a traveling block having a housing, a plurality of sheaves, and a bearing pin rotatably supporting said sheaves in said housing, means mounting said pin in said housing comprising retaining bars and cap screws, said pin having a diametric groove in each of its end faces, the walls of said housing having rabbeted sections forming continuations of each of said grooves, said retaining bars being received in said grooves and extending into said rabbeted sections, said cap screws securing said retaining bars to said pin, the end faces of said pin and of said cap screws and the outer faces of said retaining bars and of the walls of said housing all being substantially flush, the pin having force transmitting contact with the housing walls through the full thickness of the latter.

3. In a traveling block having a housing, a plurality of sheaves, and a bearing pin rotatably supporting said sheaves in said housing, means mounting said pin in said housing comprising retaining bars and cap screws, said pin having a diametric groove in each of its end faces of a depth approximating the thickness of the walls of said housing, these walls having rabbeted sections forming continuations of each of said grooves but being of less depth, said retaining bars being received in said grooves and having thinner end portions extending into said rabbeted sections, said cap screws securing said retaining bars to said pin, the end faces of said pin and of said cap screws and the outer faces of said retaining bars and of the walls of said housing all being substantially flush, the pin having force transmitting contact with the housing walls through the full thickness of the latter, and the over-all thickness of said block being confined to that needed for the sheaves and the housing walls.

AUGUST R. MAIER.

REFERENCES CITED

The following references are of record in the file of this patent:

UNITED STATES PATENTS

| Number | Name | Date |
|---|---|---|
| 1,065,771 | Born | June 24, 1913 |

FOREIGN PATENTS

| Number | Country | Date |
|---|---|---|
| 310,946 | Great Britain | Aug. 29, 1929 |